US010678003B2

(12) United States Patent
Liu et al.

(10) Patent No.: US 10,678,003 B2
(45) Date of Patent: Jun. 9, 2020

(54) OPTICAL MODULE

(71) Applicants: HISENSE BROADBAND MULTIMEDIA TECHNOLOGIES CO., LTD., Qingdao (CN); HISENSE USA CORPORATION, Suwanee, GA (US); HISENSE INTERNATIONAL CO., LTD., Qingdao (CN)

(72) Inventors: Xuxia Liu, Qingdao (CN); Yongliang Huang, Qingdao (CN); Qian Shao, Qingdao (CN)

(73) Assignees: HISENSE BROADBAND MULTIMEDIA TECHNOLOGIES CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 16/119,236

(22) Filed: Aug. 31, 2018

(65) Prior Publication Data
US 2018/0372967 A1    Dec. 27, 2018

Related U.S. Application Data

(63) Continuation of application No. 15/289,333, filed on Oct. 10, 2016, now Pat. No. 10,185,103.

(30) Foreign Application Priority Data

Mar. 4, 2016  (CN) .......................... 2016 1 0122643
Mar. 4, 2016  (CN) .......................... 2016 1 0125459

(51) Int. Cl.
*G02B 6/42*    (2006.01)
*G02B 6/32*    (2006.01)

(52) U.S. Cl.
CPC ............. *G02B 6/4214* (2013.01); *G02B 6/32* (2013.01); *G02B 6/426* (2013.01); *G02B 6/428* (2013.01); *G02B 6/4246* (2013.01); *G02B 6/4292* (2013.01)

(58) Field of Classification Search
CPC ...... G02B 6/32; G02B 6/4201; G02B 6/4204; G02B 6/4207; G02B 6/4214; G02B 6/4246; G02B 6/426; G02B 6/428; G02B 6/4292
(Continued)

(56) References Cited

U.S. PATENT DOCUMENTS 6,213,651 B1   4/2001   Jiang et al.
6,453,091 B2   9/2002   Kawai
(Continued)

FOREIGN PATENT DOCUMENTS

CN   1553240 A    12/2004
CN   102169214 A   8/2011
(Continued)

OTHER PUBLICATIONS

Office Action from Chinese Application No. 201610122643.2, dated Dec. 28, 2016 (8 pages).
(Continued)

*Primary Examiner* — Michael P Mooney
(74) *Attorney, Agent, or Firm* — Harness, Dickey & Pierce, P.L.C.

(57) ABSTRACT

The disclosure provides an optical module that includes a circuit board, a first chip, a second chip, and a lens assembly, wherein the first chip and the second chip are arranged respectively on the surface of the circuit board, and the lens assembly is arranged above the first chip and the second chip; the lens assembly includes a first optic fiber insertion port, a second optic fiber insertion port, a first reflecting
(Continued)

surface, and a second reflecting surface; the distance between the axis of the first optic fiber insertion port, and the axis of the second optic fiber insertion port is less than the distance between the first chip and the second chip; and the first reflecting surface faces the first chip, the first reflecting surface faces the second reflecting surface, and the second reflecting surface faces the first optic fiber insertion port.

13 Claims, 12 Drawing Sheets

(58) Field of Classification Search
USPC .................................. 385/14, 33, 88–94
See application file for complete search history.

(56) References Cited

U.S. PATENT DOCUMENTS

| | | | |
|---|---|---|---|
| 6,668,113 | B2 | 12/2003 | Togami et al. |
| 8,888,383 | B2 * | 11/2014 | McColloch ........... G02B 6/4284 385/93 |
| 8,923,670 | B2 | 12/2014 | Zbinden et al. |
| 2003/0053222 | A1 | 3/2003 | Togami et al. |
| 2005/0175350 | A1 | 8/2005 | Hartzell et al. |

FOREIGN PATENT DOCUMENTS

| | | |
|---|---|---|
| CN | 203149147 U | 8/2013 |
| CN | 203204202 U | 9/2013 |
| CN | 103676029 A | 3/2014 |
| CN | 203941319 U | 11/2014 |
| CN | 104375244 A | 2/2015 |
| GB | 2359900 A | 9/2001 |

OTHER PUBLICATIONS

Office Action from Chinese Application No. 201610122643.2, dated Jul. 13, 2017 (9 pages).
Extended Search Report from European Application No. 16207471.0 dated Jun. 21, 2017 (8 pages).
Office Action from Chinese Application No. 201610125459.3, dated Aug. 3, 2018 (8 pages).

* cited by examiner

OPTICAL MODULE

CROSS-REFERENCE TO RELATED APPLICATIONS

This application is a continuation of U.S. patent application Ser. No. 15/289,333 filed Oct. 10, 2016, which claims the benefit and priority of Chinese Patent Application No. 201610122643.2 filed Mar. 4, 2016 and Chinese Patent Application No. 201610125459.3 filed Mar. 4, 2016. The entire disclosures of the above applications are incorporated herein by reference.

FIELD

The present disclosure relates to the field of optical communications, and particularly to an optical module.

BACKGROUND

This section provides background information related to the present disclosure which is not necessarily prior art.

FIG. 1 is a schematic structural diagram of an optical module. As illustrated in FIG. 1, the optical module includes a circuit board P and a lens assembly L. There is a golden finger G at one end of the circuit board P, where the golden finger G is configured to be connected with an electronic device external to the optical module; wherein golden fingers are a number of golden electro-conductive contact sheets, and since they are coated with gold on their surfaces, and arranged like fingers, they are called "golden fingers", and the lens assembly L is packaged integrally and placed on the surface of one side of the circuit board P, there is formed between the lens assembly L and the circuit board P a cavity in which a light transmitting chip, a light probing chip, a light transmission driving chip, a light probe driving chip, and other electronic devices are located; and the lens assembly L includes a first optic fiber insertion port C1 and a second optic fiber insertion port C2, each of which includes a cavity O configure to have an optic fiber placed therein.

FIG. 2 is a perspective view of the optical module illustrated in FIG. 1. As illustrated in FIG. 2, the optical module further includes the light transmitting chip X1, the light transmission driving chip d1, the light probing chip X2, and the light probe driving chip d2 between the lens assembly (a part of which is not illustrated) and the circuit board, where light transmitted by the light transmitting chip X1 is transmitted to the first optic fiber insertion port C1, and exits along the axis Z1 of the first optic fiber insertion port C1; and light transmitted along the axis Z2 of the second optic fiber insertion port C2 is transmitted to the light probing chip X2 via the second optic fiber insertion port C2.

The chip includes a signal pin connected with the driving chip, the light transmitting chip X1 includes a first pin connected with the light transmission driving chip d1, the light transmission driving chip d1 includes a second pin V1 connected with the light transmitting chip X1, the light probing chip X2 includes a third pin connected with the light probe driving chip d2, and the light probe driving chip d2 includes a fourth pin V2 connected with the light probing chip X2.

SUMMARY

This section provides a general summary of the disclosure, and is not a comprehensive disclosure of its full scope or all of its features.

Some embodiments of the disclosure provide an optical module including a circuit board, a first chip, a second chip, and a lens assembly, wherein:
the first chip and the second chip are arranged respectively on the surface of the circuit board, and the lens assembly is arranged above the first chip and the second chip;
the lens assembly includes a first optic fiber insertion port, a second optic fiber insertion port, a first reflecting face, and a second reflecting face; and
the first reflecting face faces the first chip, the first reflecting face faces the second reflecting face, and the second reflecting face faces the first optic fiber insertion port.

The first reflecting face and the second reflecting face are located on the lens assembly, the first reflecting face faces the first chip, the first reflecting face faces the second reflecting face, and the second reflecting face faces the first optic fiber insertion port, so that light transmitted by the first chip can enter the first optic fiber insertion port through the first reflecting face and the second reflecting face, or light rays incident on the first optic fiber insertion port can enter the first chip through the first reflecting face and the second reflecting face.

Some embodiments of the disclosure provide an optical module including a circuit board, a first chip, a second chip, a first lens assembly, and a second lens assembly, wherein:
the first chip is arranged on the surface of the circuit board, and the first lens assembly is arranged above the first chip;
the second chip is arranged on the surface of the circuit board, and the second lens assembly is arranged above the second chip;
the first lens assembly includes a first optic fiber insertion port, a first reflecting face, and a second reflecting face;
the second lens assembly includes a second optic fiber insertion port; and
the first reflecting face faces the first chip, the first reflecting face faces the second reflecting face, and the second reflecting face faces the first optic fiber insertion port.

The first reflecting face and the second reflecting face are located on the first lens assembly, the first reflecting face faces the first chip, the first reflecting face faces the second reflecting face, and the second reflecting face faces the first optic fiber insertion port, so that light transmitted by the first chip can enter the first optic fiber insertion port through the first reflecting face and the second reflecting face, or light rays incident on the first optic fiber insertion port can enter the first chip through the first reflecting face and the second reflecting face.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

An optical module is fabricated in a Chip On Board (COB) packaging scheme by affixing a light transmitting chip and/or a light probing chip directly on a circuit board, and placing a lens assembly above the light transmitting chip and/or the light probing chip so that there is formed between the lens assembly and the circuit board a cavity in which the light transmitting chip and/or the light probing chip are placed.

Dependent upon the different function of the optical module, the optical module may include both the light transmitting chip and the light probing chip to transmit and receive light; or the optical module may include only the light transmitting chip to transmit light; or the optical module may include only the light probing chip to receive light; and there may be a number of light transmitting chips and/or light probing chips to improve the rate at which light is transmitted and/or received in a multiplexer array. The light transmitting chip needs to operate with a light transmission driving chip, and the light probing chip needs to operate with a light probe driving chip; and the light transmission driving chip and the light probe driving chip are placed on the circuit board. In order for better impedance matching, the light transmission driving chip and/or the light probe driving chip together with the light transmitting chip and/or the light probing chip are placed in the cavity formed between the lens assembly and the circuit board.

Figure 3:
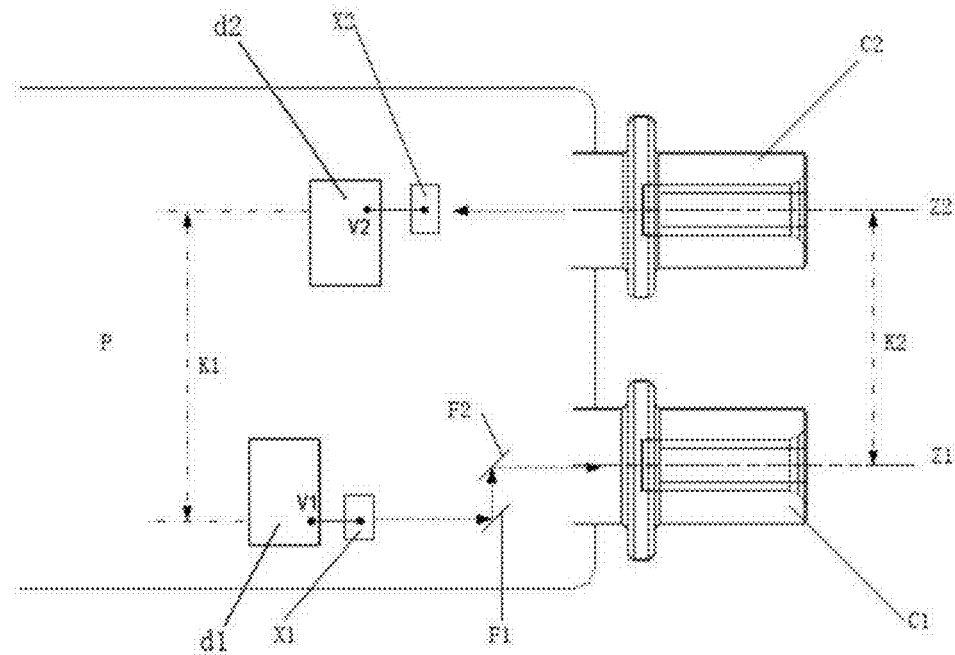
FIG. 3 is a schematic structural diagram of an optical module according to some embodiments of the disclosure.

FIG. 3 is a schematic structural diagram of an optical module according to some embodiments of the disclosure. As illustrated in FIG. 3, there is an optical module including a circuit board P, a first chip, a second chip, and a lens assembly.

In some embodiments, the circuit board is a Printed Circuit Board (PCB), or can be a Flexible Printed Circuit (FPC); the first chip can be a light transmitting chip, or can be a light probing chip; and the second chip can be a light transmitting chip, or can be a light probing chip;

The first chip and the second chip are placed respectively on the surface of the circuit board P, and the lens assembly is placed above the first chip and the second chip;

There is formed between the lens assembly and the circuit board a cavity in which the first chip and the second chip are placed;

The lens assembly includes a first optic fiber insertion port C1, a second optic fiber insertion port C2, a first reflecting face F1, and a second reflecting face F2; and The lens assembly is an optical element, the lens assembly is also a structural piece, the lens assembly can be structurally designed, a reflecting face can be arranged in the lens assembly to change an optical path, and an optic fiber insertion port can also be arranged in the lens assembly to be connected with an optic fiber.

The first optic fiber insertion port and the second optic fiber insertion port are set as required in a related protocol, and the distance between the axis Z1 of the first optic fiber insertion port and the axis Z2 of the second optic fiber insertion port is specified particularly in the protocol;

The distance K2 between the axis of the first optic fiber insertion port and the axis of the second optic fiber insertion port is less than the distance K1 between the first chip and the second chip;

The distance between the first chip and the second chip can be the distance between a light transmitting area/light receiving area of the first chip, and a light transmitting area/light receiving area of the second chip.

If the first chip is a light transmitting chip, then the first chip will include a light transmitting area, and if the first chip is a light probing chip, then the first chip will include a light receiving area; and if the second chip is a light transmitting chip, then the second chip will include a light transmitting area, and if the second chip is a light probing chip, then the second chip will include a light receiving area. The technical solution according to the embodiments of the disclosure relates to a transmission path of light in the optical module, and the distance between the first chip and the second chip is determined dependent upon where light is transmitted or where light is received instead of being measured and calculated based upon the center/gravity of an object.

The chips include pins connected with their driving chips; and as illustrated in FIG. 3, the light transmitting chip X1 includes a first pin connected with the light transmission driving chip d1, the light transmission driving chip d1 includes a second pin V1 connected with the light transmitting chip X1, the light probing chip X2 includes a third pin connected with the light probe driving chip d2, and the light probe driving chip d2 includes a fourth pin V2 connected with the light probing chip X2.

The pins need to be connected taking into account impendence matching, and in order to guarantee better impendence matching, a connection line between the first pin and the second pin is preferably short, and a connection line between the third pin and the fourth pin is preferably short, so that the position of the light transmitting chip varies with the varying position of the second pin, and the position of the light probing chip varies with the varying position of the fourth pin. The majority of existing chips are a square in shape, so the connection line between the pins is made short in such a way that the connection line is perpendicular to the side of the chip. A straight line connecting the pin of the first chip with the pin of the first driving chip is perpendicular to the side of the first driving chip; and a straight line connecting the pin of the second chip with the pin of the second driving chip is perpendicular to the side of the second driving chip. There are a number of pins on the chips and the driving chips, but the pins as referred to in the disclosure are not any pins, but the pin on the chip to be electrically connected with the driving chip, and the pin on the driving chip to be electrically connected with the chip.

The first reflecting face F1 faces the first chip X1, the first reflecting face F1 faces the second reflecting face F2, and the second reflecting face F2 faces the first optic fiber insertion port C1.

An optical path connection is established by light transmitted/received by the first chip among the first chip, the first reflecting face, the second reflecting face, and the first optic fiber insertion port.

In some embodiments, the lens assembly further includes a first lens and a second lens, where the first lens is placed between the first chip and the first reflecting face, and the second lens is placed at the first optic fiber insertion port.

The distance between the axis of the first optic fiber insertion port, and the axis of the second optic fiber insertion port is specified particularly in the protocol, and in order to guarantee compatibility with a related product, the design of the optical module shall not be altered; and as the performance of the product is improving so that the size of the driving chips is increasing, the distance between the first chip and the second chip is increasing, and at this time, the distance between the axis of the first optic fiber insertion port, and the axis of the second optic fiber insertion port is less than the distance between the first chip and the second chip. With the first reflecting face and the second reflecting face, light rays transmitted by the light transmitting chip can enter the optic fiber via the optic fiber insertion port, or the light probing chip can receive incoming light via the optic fiber insertion port, thus enabling the optic fiber insertion port.

The first reflecting face faces the first chip, the first reflecting face faces the second reflecting face, and the second reflecting face faces the first optic fiber insertion port, so that a light propagation path is created between the first chip, the first reflecting face, the second reflecting face, and the first optic fiber insertion port. The first optic fiber insertion port is configured to have a first optic fiber inserted therein, and the projection of the axis of the first optic fiber insertion port onto the circuit board will not pass the center of an effective light-emitting surface of the first chip. If the first chip is a light transmitting chip, then light can be transmitted from the first chip to the first reflecting face, reflected by the first reflecting face to the second reflecting face, and reflected by the second reflecting face to the first optic fiber insertion port, so that the light transmitted by the light transmitting chip enters the first optic fiber insertion port, and further the optic fiber; and if the first chip is a light probing chip, then light transmitted from the optic fiber will enter the first optic fiber insertion port, be transmitted from the first optic fiber insertion port to the second reflecting face, and be reflected by the second reflecting face to the first reflecting face, so that the first chip receives the light transmitted from the optic fiber.

The light exit direction or the light incidence direction of the first chip can be parallel to the circuit board, or can be perpendicular to the circuit board.

If the light exit direction or the light incidence direction of the first chip is parallel to the circuit board, then the light propagation path between the first chip and the first reflecting face will be parallel to the first optic fiber insertion port; and If the light exit direction or the light incidence direction of the first chip is perpendicular to the circuit board, then the light propagation path between the first chip and the first reflecting face will be perpendicular to the first optic fiber insertion port.

If the first chip is a light transmitting chip, then light transmitted by the light transmitting chip will be transmitted to the first reflecting face, and at this time, the light propagation path between the first chip and the first reflecting face will be created by a propagation path of the light; and if the first chip is a light receiving chip, then light transmitted by the first reflecting surface will be transmitted to the light receiving chip, and at this time, the light propagation path between the first chip and the first reflecting face will be created by the light transmitted by the first reflecting face to the light receiving chip.

If the light exit direction of the first chip is parallel to the circuit board, then the light transmitting chip will typically be embodied as a light transmitting chip transmitting light from the sides thereof. In a real product, the first chip is a light transmitting chip X1, and the second chip is a light probing chip X2, as illustrated in FIG. 3; and of course, there will be a number of combinations of types of the first chip and the second chip in a real product, for example, both the first chip and the second chip are light transmitting chips; both the first chip and the second chip are light probing chips; and the first chip is a light probing chip, and the second chip is a light transmitting chip, just to name a few examples. The light probing chip X2 coincides with the axis Z2 of the second optic fiber insertion port, the light transmitting chip X1 does not coincide with the axis Z1 of the first optic fiber insertion port, and the distance K2 between the axis of the first optic fiber insertion port, and the axis of the second optic fiber insertion port is less than the distance k1 between the light transmitting chip X1 and the light probing chip X2.

The light probing chip X2 receives light from the second optic fiber insertion port, and light transmitted by the light transmitting chip X1 cannot pass the first optic fiber insertion port directly.

The light transmitted by the light transmitting chip X1 is reflected by the first reflecting face F1 to the second reflecting face F2, and reflected by the second reflecting face F2 to the first optic fiber insertion port C1.

Figure 4:
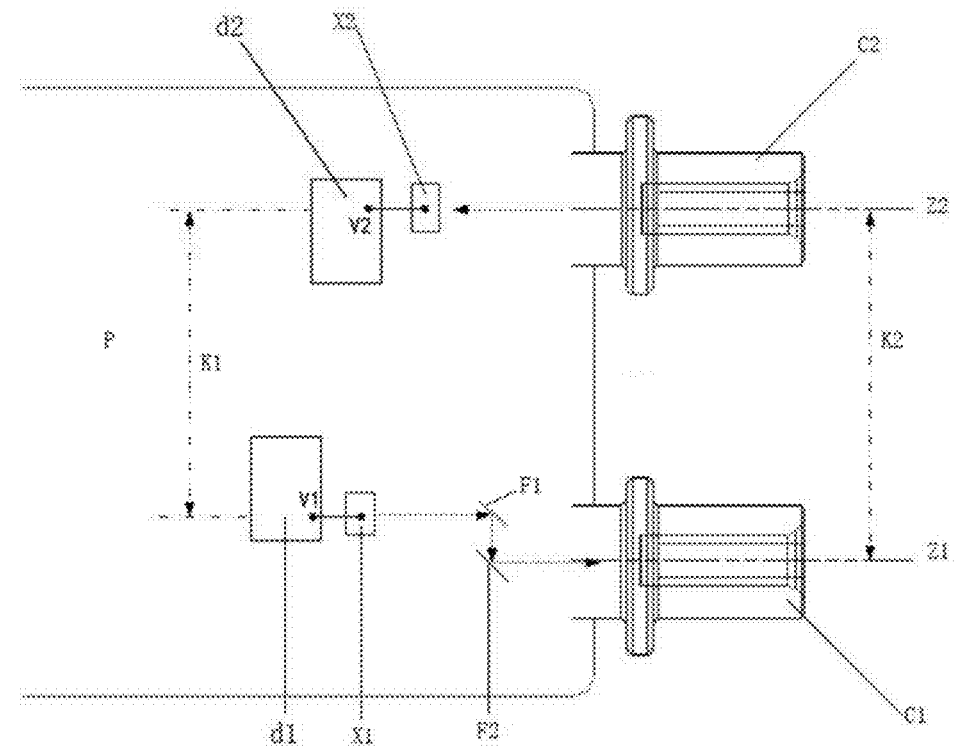
FIG. 4 is a schematic structural diagram of an optical module according to some embodiments of the disclosure.

In some embodiments, the distance K2 between the axis of first optic fiber insertion port, and the axis of the second optic fiber insertion port is more than the distance K1 between the first chip and the second chip as illustrated in FIG. 4. The light propagation paths between the chips and the optic fiber insertion ports are similar to the embodiment above with K2 being less than K1, so a repeated description thereof will be omitted here.

Since an optical path is reversible, the light transmitting chip can be placed at the light probing chip, and the light probing chip can be placed at the light transmitting chip.

Particularly the first chip and the second chip can be but will not be limited to light transmitting chips or light probing chips respectively, and they can be adjusted adaptively in reality to the structure of the lens assembly, and the particular design of the optical module because an optical path is reversible.

The light transmitting chip transmitting light from the sides thereof is a common type of light transmitting chip, and the structural setting above can address a design of an optical path when the light transmitting chip transmitting light from the sides thereof is put in use.

Figure 1:
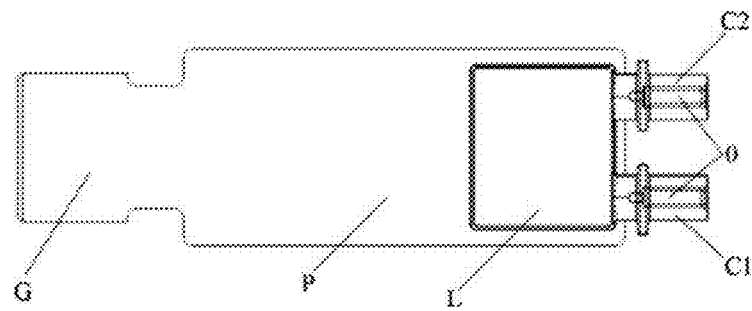
FIG. 1 is a schematic structural diagram of an optical module in the prior art.
Figure 2:
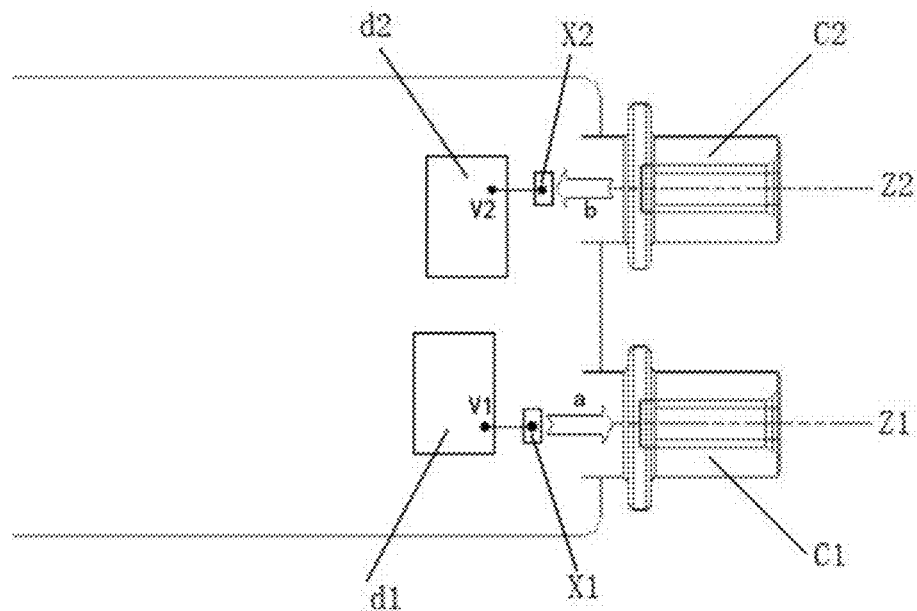
FIG. 2 is a perspective view of the optical module illustrated in FIG. 1.

As illustrated in FIG. 1 and FIG. 2, the lens assembly is placed on the surface of the circuit board, and a closed cavity is formed between the lens assembly and the circuit board.

The light transmitting chip and the light probing chip are placed on the surface of the circuit board, the lens assembly is placed above the light transmitting chip and the light probing chip, and the light transmitting chip, the light transmission driving chip, the light probing chip, and the light probe driving chip are placed in the closed cavity.

Figure 5:
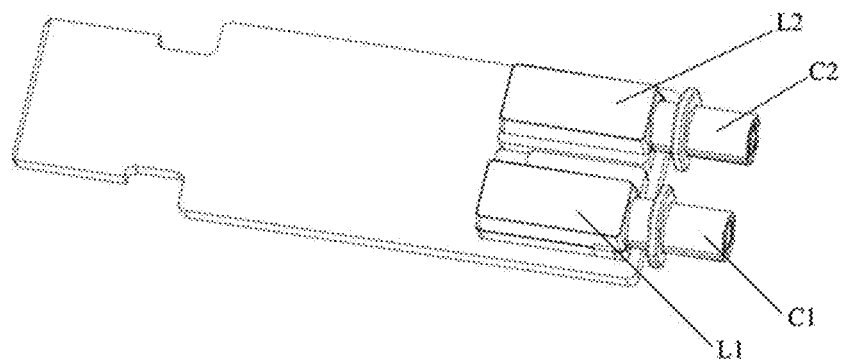
FIG. 5 is a schematic structural diagram of another optical module according to some embodiments of the disclosure.

FIG. 5 is a schematic structural diagram of an optical module according to some embodiments of the disclosure. As illustrated in FIG. 5, an optical module according to another aspect of the embodiments of the disclosure includes a first lens assembly L1 and a second lens assembly L2, where a first cavity is formed between the first lens assembly L1 and a circuit board, and a second cavity is formed between the second lens assembly L2 and the circuit board; the first cavity is isolated from the second cavity; a light transmitting chip and a light transmission driving chip are placed in the first cavity; and a light probing chip and a light probe driving chip are placed in the second cavity. The light transmitting chip and the light probing chip are separated using the first lens assembly L1 and the second lens assembly L2 to thereby isolate the light transmitting chip from the light probing chip so as to alleviate mutual interference between the light transmitting chip and the light probing chip.

The first lens assembly L1 includes a first optic fiber insertion port C1, and the second lens assembly L2 includes a second optic fiber insertion port C2; and light transmitted by the light transmitting chip X1 is transmitted to the outside via the first optic fiber insertion port C1, and light transmitted from the outside is received by the light probing chip X2 via the second optic fiber insertion port C2.

Some embodiments of the disclosure provide an optical module including a circuit board, a first chip, a second chip, a first lens assembly, and a second lens assembly.

In some embodiments, the circuit board is a Printed Circuit Board (PCB); the first chip can be a light transmitting chip, or can be a light probing chip; and the second chip can be a light transmitting chip, or can be a light probing chip;

The first chip is placed on the surface of the circuit board, and the first lens assembly is placed above the first chip;

The second chip is placed on the surface of the circuit board, and the second lens assembly is placed above the second chip;

Cavities in which the first chip and the second chip respectively are placed are formed among the first lens assembly, the second lens assembly respectively, and the circuit board;

The first lens assembly includes a first optic fiber insertion port, a first reflecting face, and a second reflecting face;

The second lens assembly includes a second optic fiber insertion port;

The distance between the first chip and the second chip can be the distance between a light transmitting area/light receiving area of the first chip, and a light transmitting area/light receiving area of the second chip;

If the first chip is a light transmitting chip, then the first chip will include a light transmitting area, and if the first chip is a light probing chip, then the first chip will include a light receiving area; and if the second chip is a light transmitting chip, then the second chip will include a light transmitting area, and if the second chip is a light probing chip, then the second chip will include a light receiving area. The technical solution according to the embodiments of the disclosure relates to a transmission path of light in the optical module, and the distance between the first chip and the second chip is determined dependent upon where light is transmitted or where light is received instead of being measured and calculated based upon the center/gravity of an object.

The first reflecting face faces the first chip, the first reflecting face faces the second reflecting face, and the second reflecting face faces the first optic fiber insertion port.

In the embodiments above, the distance K2 between the axis of the optic fiber insertion port, and the axis of the second optic fiber insertion port is not equal to the distance K1 between the first chip and the second chip. K2 may be less than K1, or K2 may be more than K1. The following embodiments will be described in which the distance K2 between the axis of the optic fiber insertion port, and the axis of the second optic fiber insertion port is less than the distance K1 between the first chip and the second chip, but those embodiments in which K2 is more than K1 will be similar to these embodiments in which K2 is less than K1, so a repeated description thereof will be omitted here.

Figure 6:
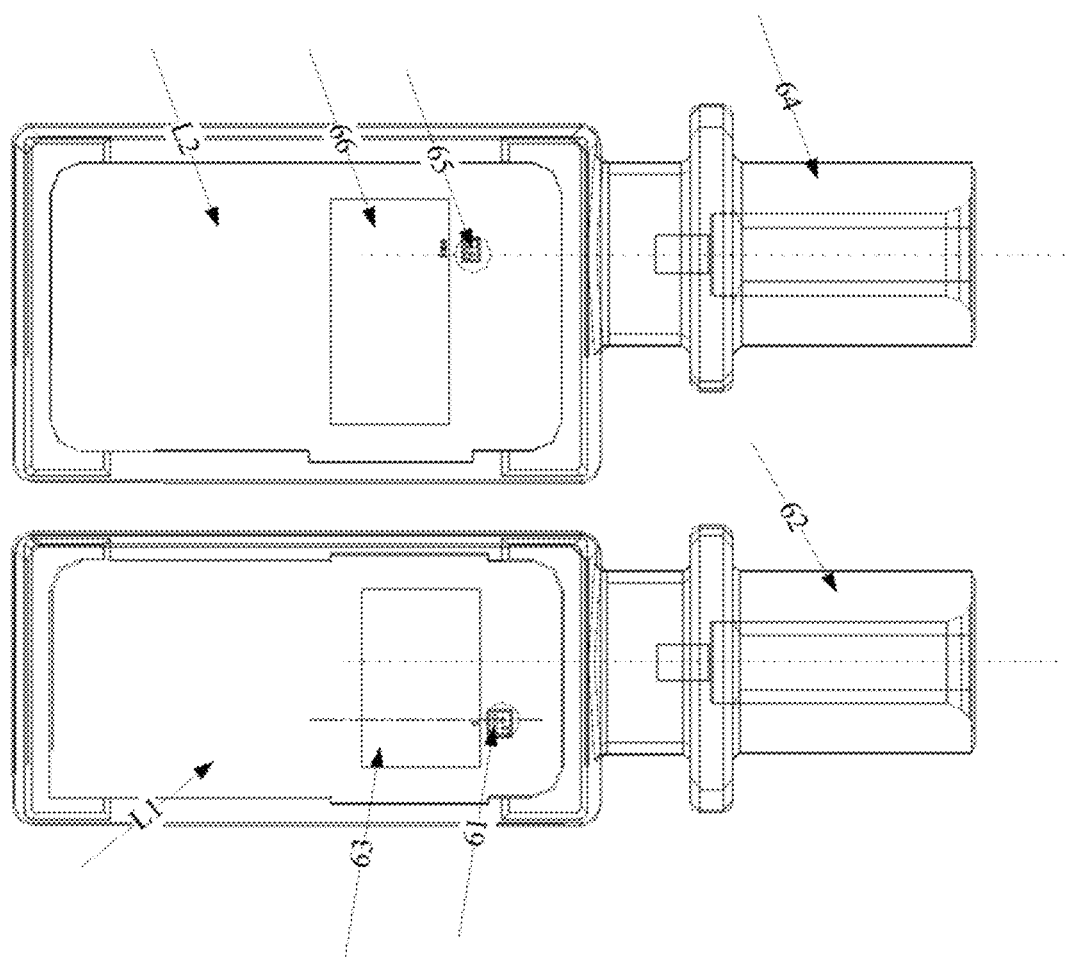
FIG. 6 is a schematic structural diagram of an optical module according to some embodiments of the disclosure.

In some embodiments of the disclosure, if the first chip is a light transmitting chip, and the second chip is a light probing chip, then in the optical module as illustrated in FIG. 6, the first lens assembly L1 and the second lens assembly L2 are lens assemblies packaged separately on the circuit board; the first lens assembly L1 is sleeved above a laser 61 and a first driving chip 63, and the light transmitting chip is arranged in the laser 61; and the second lens assembly L2 is sleeved above a prober 65 and a driving chip 66 of the prober, and the light probing chip is arranged in the prober 65, where the first lens assembly includes a first optic fiber insertion port 62, a first reflecting face, and a second reflecting face, and the projection of the central axis of an optic fiber arranged in the first optic fiber insertion port 62 onto the circuit board will not pass the center of an effective light-emitting surface of the laser chip; and the second lens assembly 63 includes a second optic fiber insertion port, and the projection of the central axis of an optic fiber arranged in the second optic fiber insertion port 64 onto the circuit board will pass the center of an effective light-emitting surface of the prober chip; and where a light signal entering the second lens assembly L2 can be received by the prober chip after being deflected once by the reflecting face of the lens assembly.

Figure 7:
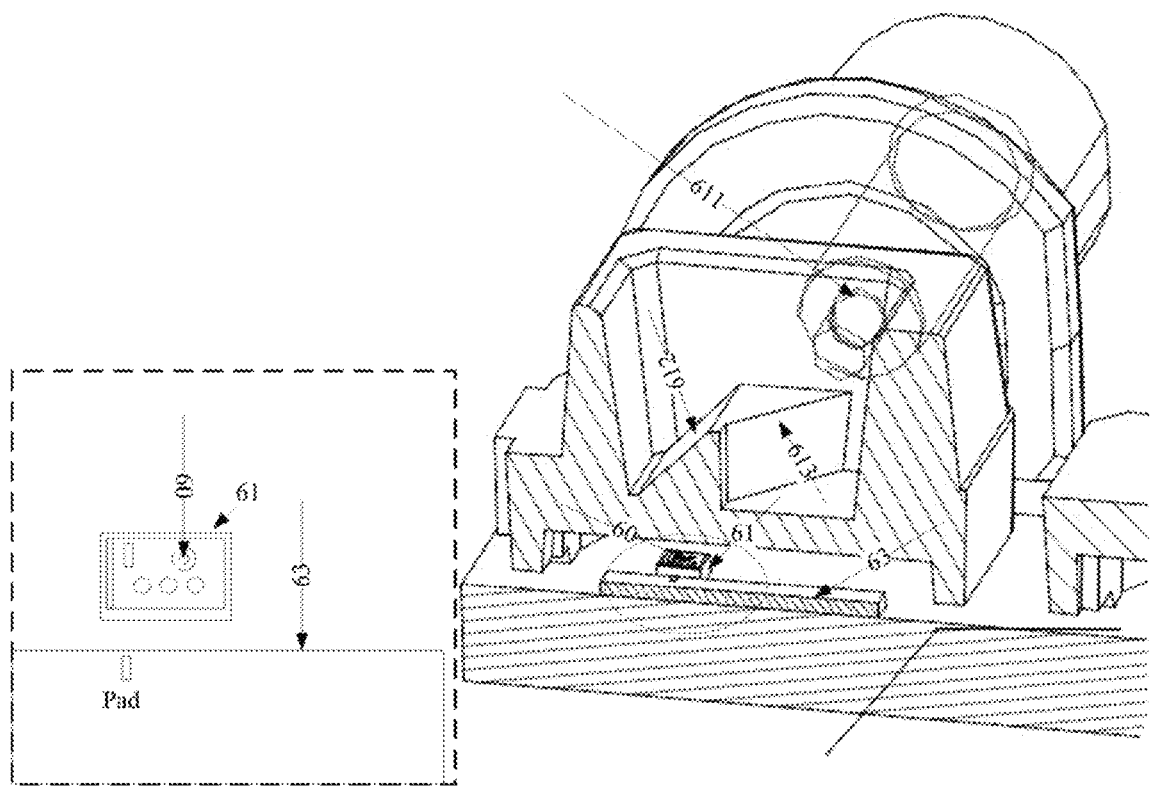
FIG. 7 is a schematic structural diagram of a transmitter lens assembly of an optical module according to some embodiments of the disclosure.

As illustrated in FIG. 7, the laser chip 60, i.e., the light transmitting chip, is arranged in the laser 61, that is, the laser chip 60 and the first driving chip 63 are arranged in a cavity formed between the first lens assembly L1 and the circuit board P, and a first incident light signal transmitted by the laser chip 60 enters the first lens assembly L1. The first lens assembly L1 includes a first optic fiber insertion port 611 configured to have a first optic fiber inserted therein, and the projection of the central axis of the first optic fiber insertion port 611 onto the circuit board P will not pass the center of an effective light-emitting surface of the laser chip 60. The projection of the central axis of the first optic fiber insertion port 611 onto the circuit board P will not pass the center of the effective light-emitting surface of the laser chip 60 in such a way that the laser chip is affixed on the circuit board P away from the projection of the central axis of the first optic fiber insertion port 611 onto the circuit board P, so that the distance between the laser driving chip and the prober driving chip is extended in the limited space of the circuit board P to package separately the transmitter lens assembly L1 and the receiver lens assembly L2.

If the projection of the central axis of the first optic fiber insertion port 611 onto the circuit board P does not pass the center of the effective light-emitting surface of the laser chip 60, then the first lens assembly L1 will have the first incident light signal, transmitted by the light transmitting chip, deflected for a number of times in the first lens assembly L1, and the deflected light signal will enter the first optic fiber via the first optic fiber insertion port 611.

FIG. 7 illustrates a transmission optical path of the first incident light signal, transmitted by the laser chip 60, in the first lens assembly L1, where the first lens assembly L1 includes a first reflecting face 612 and a second reflecting face 613, so that the first incident light signal entering the first lens assembly L1 is deflected by firstly the reflecting face 612 and then the second reflecting face 613, and the deflected light signal enters the first optic fiber via the first optic fiber insertion port 611.

The first reflecting face 612 is configured to receive the first incident light signal transmitted by the laser chip 60, and to reflect the first incident light signal, thus resulting in a first reflected light signal; and The second reflecting face 613 is configured to receive the first reflected light signal, and to reflect the first reflected light signal, thus resulting in a second reflected light signal, so that the second reflected light signal is received by the first optic fiber after being transmitted through the second lens assembly.

The first incident light signal is totally reflected by the first reflecting face 612, thus resulting in the first reflected light signal; and the first reflected light signal is totally reflected by the second reflecting face 613, thus resulting in the second reflected light signal.

The first incident light signal is totally reflected by the first reflecting face 612 and the second reflecting face 613 in such an optical path that the first incident light signal incident on the first reflecting face 612 is totally reflected by the first reflecting face 612, thus resulting in the first reflected light signal, the first reflected light signal is transmitted to the second reflecting face 613, the first reflected light signal is totally reflected by the second reflecting face 613, thus resulting in the second reflected light signal, and the second reflected light signal is received by the first optic fiber via the first optic fiber insertion port 611.

Figure 8:
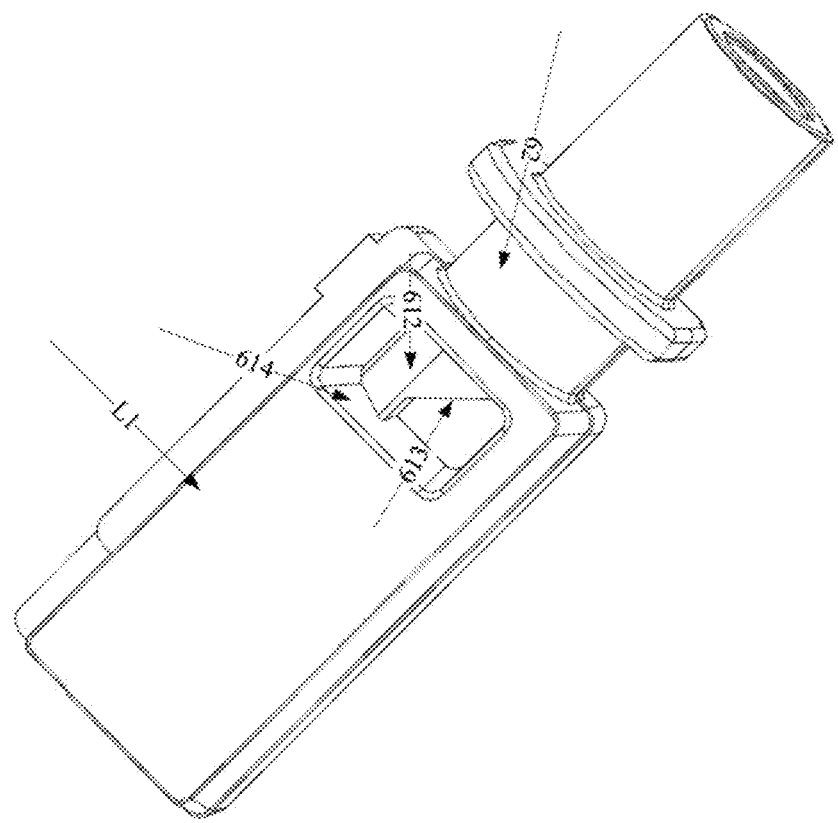
FIG. 8 is a schematic structural diagram of a transmitter lens assembly of an optical module according to some embodiments of the disclosure.

In order to enable the light signals incident on the first reflecting face 612 and the second reflecting face 613 to be totally reflected, the first lens assembly L1 further includes a first cavity 614 as illustrated in FIG. 8, where the first cavity 614 is a concave groove on the upper surface of the first lens assembly L1, the first cavity 614 is formed by removing a pattern drafting body packaging the first lens assembly L1, and the first cavity 614 includes a number of pattern drafting faces among which the first reflecting face 612 and the second reflecting face 613 are pattern drafting faces capable of deflecting the optical path of the first incident light signal entering the first lens assembly L1.

Figure 9:
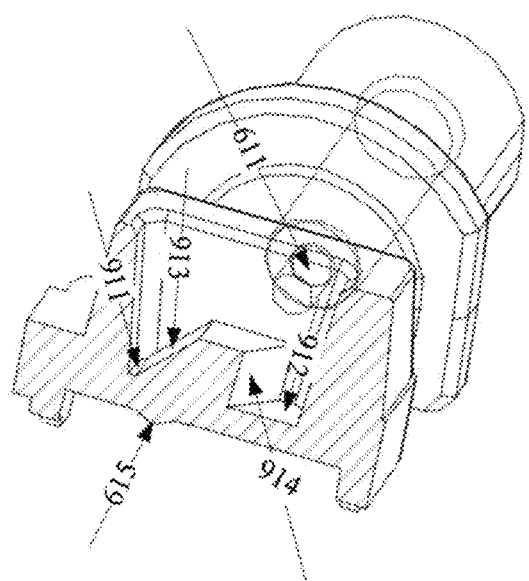
FIG. 9 is a schematic structural diagram of a transmitter lens assembly of an optical module according to some embodiments of the disclosure.

FIG. 9 illustrates the pattern drafting faces in the first cavity 614 of the first lens assembly L1, where there are a first horizontal pattern drafting face 911 and a second horizontal pattern drafting face 912, both of which are parallel to the circuit board P, on the bottom of the first cavity 614, and the first horizontal pattern drafting face 911 and the second horizontal pattern drafting face 912 are spaced by a bump including three pattern drafting faces on the sides thereof, where the pattern drafting face on the side at an inclined angle from the plane where the circuit board P is located is the first pattern drafting face 913; and the other two pattern drafting faces on the sides are arranged opposite to the first pattern drafting face 913, and at an angle of approximately 90° from the circuit board P, and such one of these two pattern drafting faces on the sides approximately perpendicular to the circuit board P that is proximate to the first optic fiber insertion port is the second pattern drafting face 914. These three pattern drafting faces on the sides intersect with each other at the upper surface 915 of the bump, where the first pattern drafting face 913 and the second pattern drafting face 914 can deflect the optical path of the first incident light signal entering the first lens assembly L1, so that firstly the first incident light signal entering the first lens assembly L1 is totally reflected for the first time by the first pattern drafting face 913, thus resulting in a first reflected light signal, the first reflected light signal is incident on the second pattern drafting face 914 in the reflection direction, and totally reflected for the second time on the second pattern drafting face 914, thus resulting in a second reflected light signal, and the second reflected light signal enters the first optic fiber via the first optic fiber insertion port 611. In summary, the first reflecting face 612 is the first pattern drafting face 913 located in the first cavity 614 in FIG. 9, and the second reflecting face 613 is a second pattern drafting face 914 located in the first cavity 614.

Here the angle between the first pattern drafting face 913 and the circuit board P, and the angle between the second pattern drafting face 914 and the circuit board P can be preset as needed, although the embodiments of the disclosure will not be limited in this regard.

Figure 10:
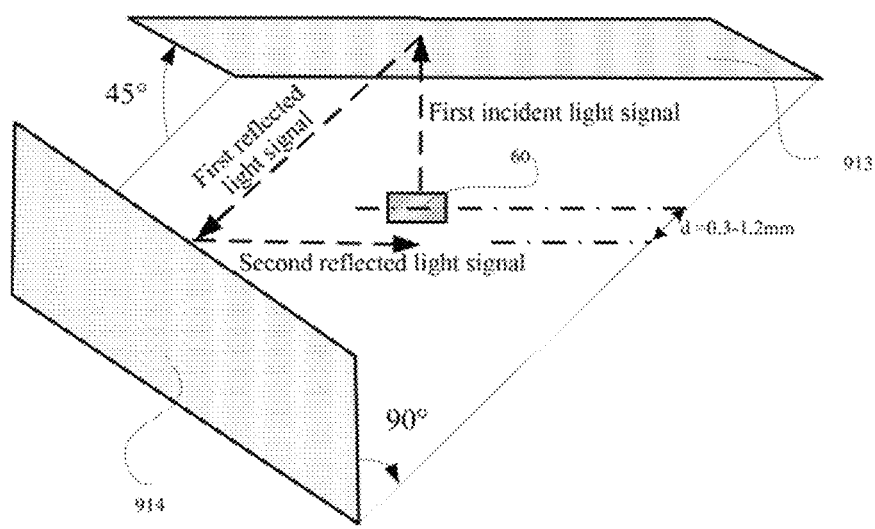
FIG. 10 is a schematic diagram of transmission in an optical path in a first lens assembly L1 according to some embodiments of the disclosure.

In some embodiments, as illustrated in FIG. 10, the angle between the first pattern drafting face 913 and the circuit board P is 45°, and the first pattern drafting face 914 is parallel to the axis of the first optic fiber insertion port; and since the light transmitting chip and the second reflecting face are located on the same side of the first reflecting face, the first incident light signal is totally reflected by the first pattern drafting face 913, so that the optical axis of the first incident light signal is rotated by 90° in a plane perpendicular to the circuit board P, and transmitted perpendicular to the axis of the first optic fiber insertion port, thus resulting in a first reflected light signal transmitted to the second reflecting face, where the optical axis of the first reflected light signal is parallel to the circuit board P. The second pattern drafting face 914 is perpendicular to the circuit board P, and at an angle of 45° from the axis of the first optic fiber insertion port; and since the first reflecting face and the first optic fiber insertion port are located on the same side of the second reflecting face, the first reflected light signal is totally reflected by the second pattern drafting face 914, so that the optical axis of the first reflected light signal is rotated by 90° in a plane parallel to the circuit board P, thus resulting in a second reflected light signal transmitted to the first optic fiber insertion port.

In a process of packaging the real first lens assembly L1, in order to facilitate removal of a pattern drafting body, the second pattern drafting face 914 tends not to be absolutely perpendicular to the circuit board P, and the angle between the second pattern drafting face 914 and the circuit board P is approximate to 90°, so the angle between the first pattern drafting face 913 and the circuit board P will also be offset accordingly in order to accommodate the optical path as required.

Figure 11:
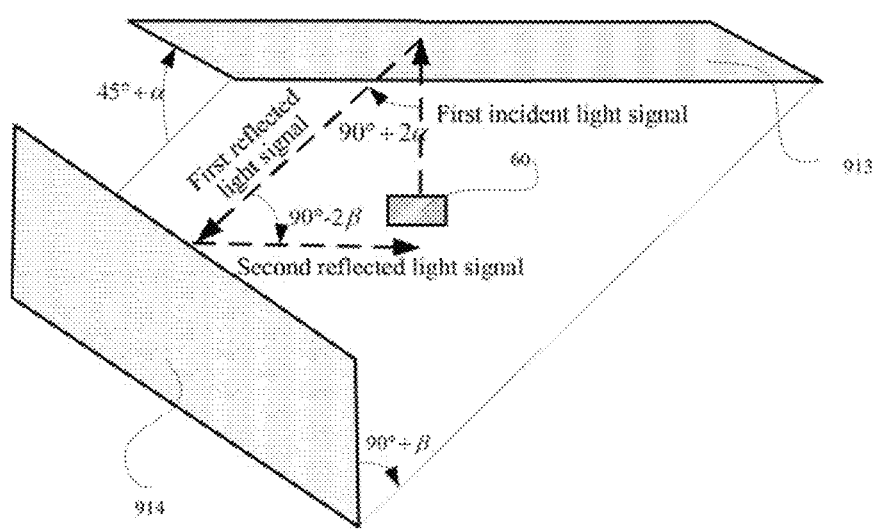
FIG. 11 is a schematic diagram of transmission in an optical path in a first lens assembly L1 according to some embodiments of the disclosure.

In some embodiments, as illustrated in FIG. 11, the angle between the first pattern drafting face 913 and the circuit board P is 45°+α, so that the first incident light signal is totally reflected by the first reflecting face 612 so that the optical axis of the first incident light signal is rotated by 90°+2α in a plane perpendicular to the circuit board P, thus resulting in a first reflected light signal; and the angle between the second pattern drafting face 914 and the circuit board P is 90°+β, and the angle between the second pattern drafting face 914, and a plane defined by the first incident light signal and the first reflected light signal is 45°, so that the first reflected light signal is totally reflected by the second pattern drafting face 914 so that the optical axis of the first reflected light signal is rotated by 90°−2β in a plane parallel to the circuit board P, thus resulting in a second reflected light signal, where α=±3°, and β=+2°.

Figure 12:
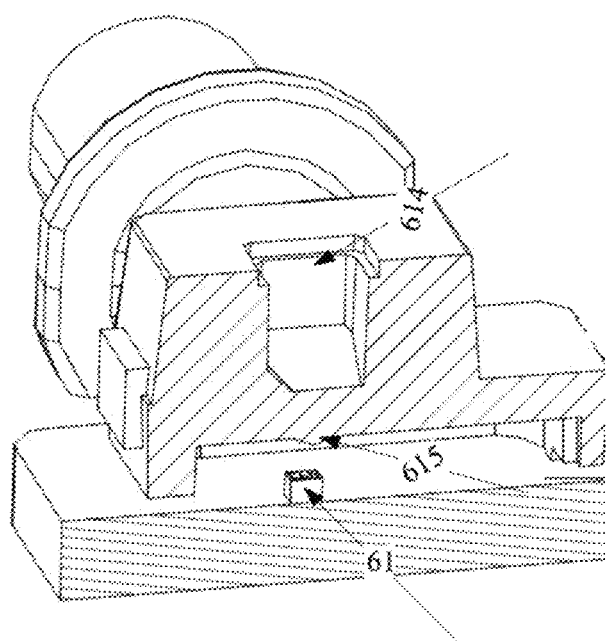
FIG. 12 is a schematic structural diagram of a transmitter lens assembly of an optical module according to some embodiments of the disclosure.

In order to improve the efficiency of optical coupling by the light transmitting chip and the first lens assembly L1, the first lens assembly L1 further includes a first lens 615 as illustrated in FIG. 9 or FIG. 12, where a small bump on the first lens assembly L1 is the first lens 615. The first lens 615 is located above the laser chip 60 (where the laser chip 60 is arranged in the laser 61 in FIG. 12), and configured to converge the first incident light signal transmitted by the laser chip 60, where the converged first incident light signal is incident on the first reflecting face 612 in an optical path perpendicular to the circuit board P.

In order to improve the efficiency of optical coupling by the first lens assembly L1 and the optic fiber, the first lens assembly L1 further includes a second lens (not illustrated) located at the first optic fiber insertion port 611, and configured to converge and then couple the second reflected light signal into the first optic fiber.

In the optical module above, in order to enable the transmitter lens assembly L1 and the receiver lens assembly L2 to be packaged separately on the circuit board P, the distance d between the projection of the central axis of the first optic fiber insertion port 611 onto the circuit board P, and the center of the effective light-emitting surface of the laser chip 60 is 0.3 to 1.2 mm as illustrated in FIG. 10. In the embodiment above, the distance between the first driving chip 63 of the laser 60, and the prober driving chip can differ by more than 1.2 mm to thereby enable the transmitter lens assembly L1 and the receiver lens assembly L2 to be packaged separately on the circuit board P.

In the embodiment above, both the first lens assembly L1 and the second lens assembly L2 are separately packaged lens assemblies, and the position of the laser chip 60 in the first lens assembly L1 is adjusted so that the laser chip 60 is affixed on the circuit board P away from the projection of the central axis of the first optic fiber insertion port 611 onto the circuit board P, and in this way, the projection of the central axis of the first optic fiber insertion port 611 onto the circuit board P will not pass the center of the effective light-emitting surface of the laser chip 60, so that the laser chip 60 and the first driving chip 63 are positioned on the circuit board P as a whole away from the central line between a light transmitting port and a light receiving port, so the distance between the first driving chip 63 of the laser, and the prober driving chip is increased to thereby reserve a larger space on the circuit board P for the first lens assembly L1 and the second lens assembly L2 to be package separately on the circuit board. The first lens assembly L1 is structurally adapted by arranging the first reflecting face 612 and the second reflecting face 613 in the first lens assembly L1 to alter the transmission optical path of the first incident light signal, transmitted by the laser chip 60, in the first lens assembly L1, so that the first incident light signal entering the first lens assembly L1 is deflected by firstly the first reflecting face 612 and then the second reflecting face 613, and the deflected light signal enters the first optic fiber via the first optic fiber insertion port 311. Both the first lens assembly L1 and the second lens assembly L2 are separately packaged lens assemblies without any interference to their respective optical paths to thereby improve the efficiency of optical coupling by the transmitter and the receiver of the optical module.

Figure 13:
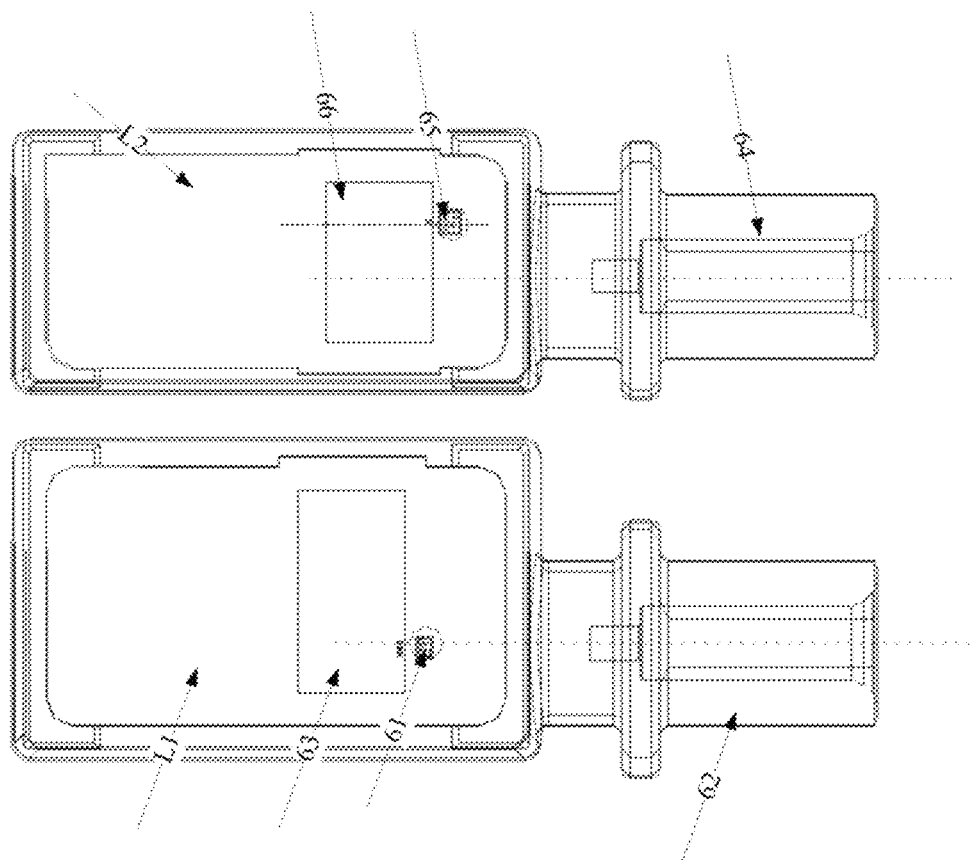
FIG. 13 is a schematic structural diagram of an optical module according to some embodiments of the disclosure.

In some embodiments of the disclosure, if the first chip is a light probing chip, and the second chip is a light transmitting chip, then in the optical module as illustrated in FIG. 13, the first lens assembly L1 and the second lens assembly L2 are lens assemblies packaged separately on the circuit board; the first lens assembly L1 is sleeved above a laser 61 and a first driving chip 63, and a laser chip, i.e., the light transmitting chip, is arranged in the laser 61; and the second lens assembly L2 is sleeved above a prober 65 and a driving chip 66 of the prober, where the second lens assembly includes a second optic fiber insertion port 64, and the projection of the central axis of an optic fiber arranged in the second optic fiber insertion port 64 onto the circuit board will not pass the center of an effective probing face of the prober chip; and the projection of the central axis of an optic fiber arranged in the first optic fiber insertion port 62 onto the circuit board passes the center of a working light transmitting face of the laser chip; and where a light signal entering the first lens assembly L1 can be received by the optic fiber arranged in the first optic fiber insertion port 62 after being deflected once by the reflecting face of the lens assembly.

Figure 14:
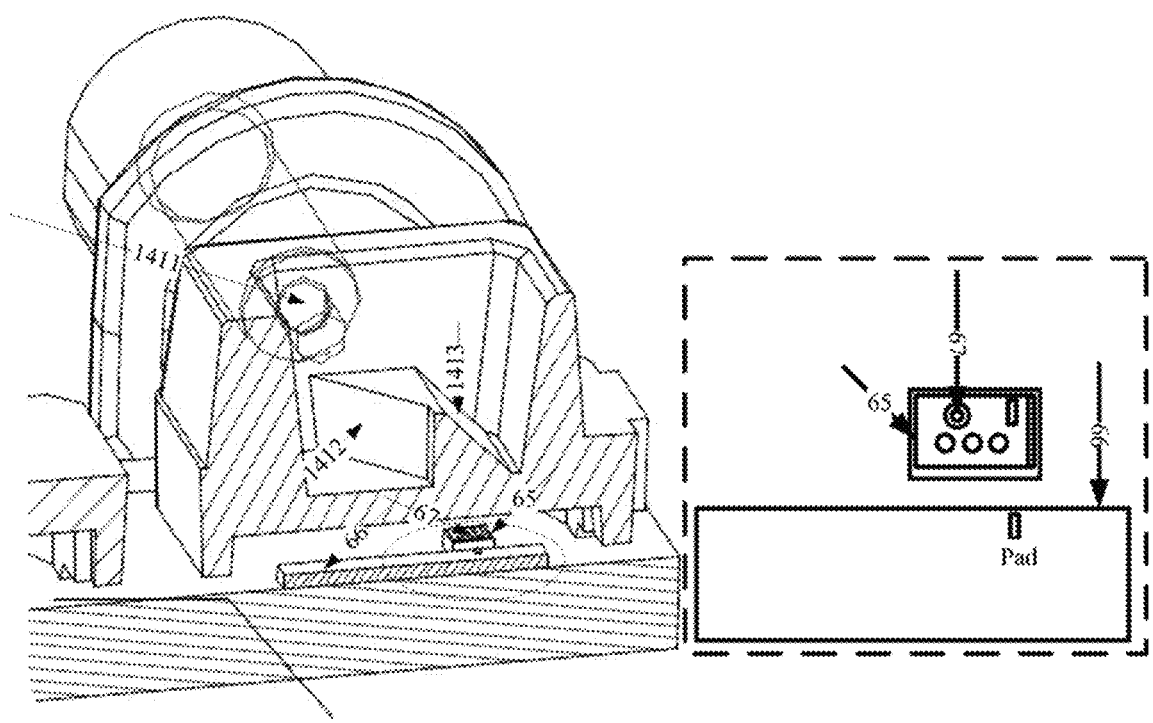
FIG. 14 is a schematic structural diagram of a receiver lens assembly of an optical module according to some embodiments of the disclosure.

As illustrated in FIG. 14, a light prober chip 67 is arranged in the prober 65, that is, the prober chip 67, and a driving chip 66 of the prober are arranged in the cavity formed between the second lens assembly L2 and the circuit board P, and a first incident light signal received by the prober chip 67 enters the second lens assembly L2 through the cavity. The second lens assembly L2 includes a second optic fiber insertion port 1411 configured to have a second optic fiber inserted therein, and the projection of the central axis of the second optic fiber insertion port 1411 onto the circuit board will not pass the center of the effective probing face of the prober chip 67; and it shall be noted that the second optic fiber is configured to transmit a received light signal to the second optic fiber insertion port 1411. The projection of the central axis of the second optic fiber insertion port 1411 onto the circuit board will not pass the center of the effective probing face of the prober chip 67 in such a way that the prober chip 67 is affixed on the circuit board P away from the projection of the central axis of the second optic fiber insertion port 1411 onto the circuit board P, so that the distance between the laser driving chip and the prober driving chip is extended in the limited space of the circuit board P to package separately the transmitter lens assembly L1 and the receiver lens assembly L2.

A second incident light signal received by the second optic fiber insertion port 1411 of the second lens assembly L2 is deflected for a number of times in the second lens assembly L2 after entering the second lens assembly L2, and the deflected light signal is received by the prober chip 67 located below the second lens assembly L2.

Figure 15:
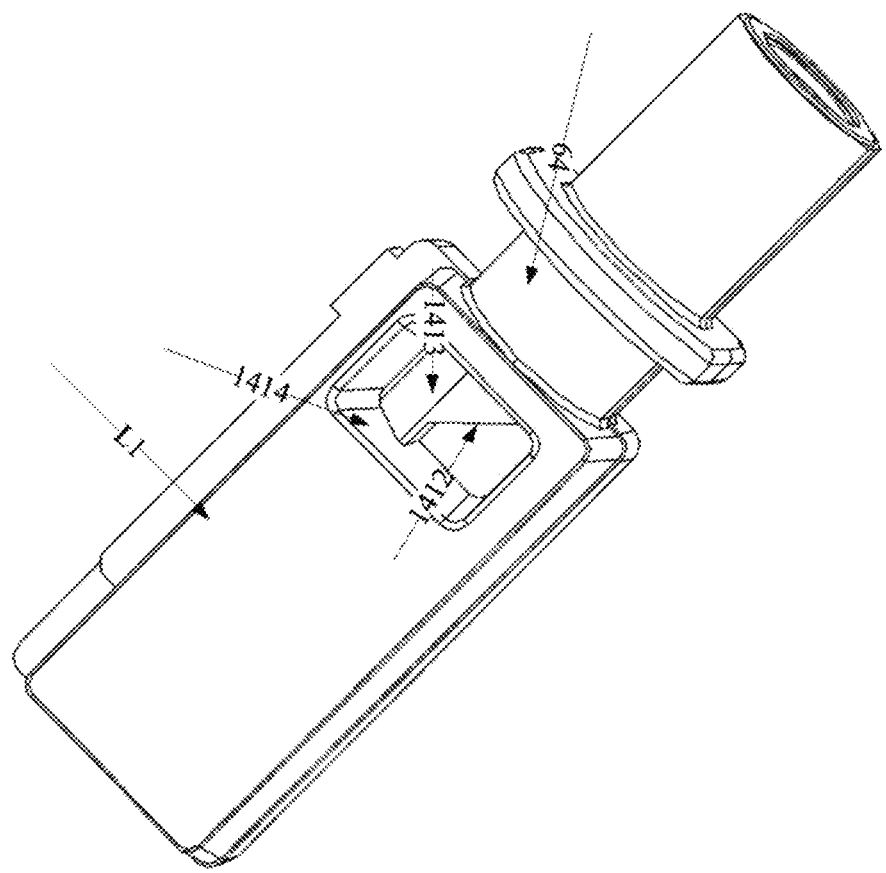
FIG. 15 is a schematic structural diagram of a receiver lens assembly of an optical module according to some embodiments of the disclosure.

As illustrated in FIG. 15, the second lens assembly L2 includes a third reflecting face 1412 and a fourth reflecting face 1413, so that a second incident light signal entering the second lens assembly L2 is reflected by firstly the third reflecting face 1412 and then the fourth reflecting face 1413, and the reflected light signal is received by the light prober chip 67.

The third reflecting face 1412 is configured to receive the second incident light signal which is an incident light signal entering the second lens assembly L2 via the second optic fiber insertion port 1411, and to reflect the second incident light signal, thus resulting in a third reflected light signal; and the fourth reflecting face 1413 is configured to receive the third reflected light signal, and to reflect the third reflected light signal, thus resulting in a fourth reflected light signal, where the fourth reflected light signal is received by the prober chip 67 after being transmitted through the second lens assembly L2.

The second incident light signal is totally reflected by the third reflecting face 1412, thus resulting in the third reflected light signal; and the third reflected light signal is totally reflected by the fourth reflecting face 1413, thus resulting in the fourth reflected light signal.

The second incident light signal is totally reflected by the third reflecting face 1412 and the fourth reflecting face 1413 in such an optical path that the second incident light signal transmitted to the third reflecting face 1412 is totally reflected by the third reflecting face 1412, thus resulting in the third reflected light signal, the third reflected light signal is transmitted to the fourth reflecting face 1413, the third reflected light signal is totally reflected by the fourth reflecting face 1413, thus resulting in the fourth reflected light signal, and the fourth reflected light signal is received by the prober chip 67 after being transmitted through the second lens assembly L2.

In order to enable the light signals incident on the third reflecting face 1412 and the fourth reflecting face 1413 to be totally reflected, the second lens assembly L2 further includes a second cavity 1414, where the second cavity 1414 is a concave groove on the upper surface of the second lens assembly L2, the second cavity 1414 is formed by removing a pattern drafting body packaging the second lens assembly L2, and the second cavity 1414 includes a number of pattern drafting faces among which the third reflecting face 1412 and the fourth reflecting face 1413 are pattern drafting faces capable of deflecting the optical path of the second incident light signal entering the second lens assembly L2.

Figure 16:
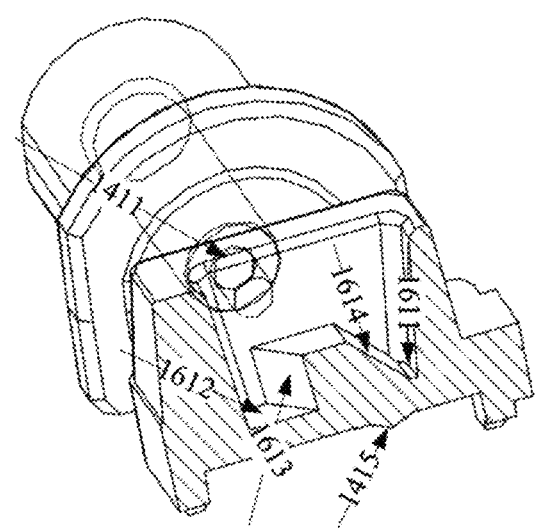
FIG. 16 is a schematic structural diagram of a receiver lens assembly of an optical module according to some embodiments of the disclosure.

FIG. 16 illustrates the pattern drafting faces in the second cavity 1414 of the second lens assembly L2, where there are a third horizontal pattern drafting face 1611 and a fourth horizontal pattern drafting face 1612, both of which are parallel to the circuit board P, on the bottom of the second cavity 1414, and the third horizontal pattern drafting face 1611 and a fourth horizontal pattern drafting face 1612 are spaced by a bump including three pattern drafting faces on the sides thereof, where two pattern drafting faces on the sides are arranged at an angle of approximately 90° from the circuit board P, and such one of these two pattern drafting faces on the sides approximately perpendicular to the circuit board P that is proximate to the second optic fiber insertion port 1411 is the third pattern drafting face 1613; and the other pattern drafting face on the side arranged opposite to these two pattern drafting faces on the sides, and at an inclined angle from the plane where the circuit board P is located is the fourth pattern drafting face 1614. These three pattern drafting faces on the sides intersect with each other at the upper surface of the bump, where the third pattern drafting face 1613 and the fourth pattern drafting face 1614 can deflect the optical path of the second incident light signal entering the second lens assembly L2, so that firstly the second incident light signal entering the second lens assembly L2 is totally reflected for the first time by the third pattern drafting face 1613, thus resulting in a third reflected light signal, the third reflected light signal is incident on the fourth pattern drafting face 1614 in the reflection direction, and totally reflected for the second time on the fourth pattern drafting face 1614, thus resulting in a fourth reflected light signal, and the fourth reflected light signal enters the light prober chip 67 after being transmitted through the second lens assembly L2. In summary, the third reflecting face 1412 is the third pattern drafting face 1613 located in the second cavity 1414 in FIG. 16, and the fourth reflecting face 1413 is a fourth pattern drafting face 1614 located in the second cavity 1414.

Here the angle between the third pattern drafting face 1613 and the circuit board P, and the angle between the fourth pattern drafting face 1614 and the circuit board P can be preset as needed, although the embodiments of the disclosure will not be limited in this regard.

Figure 17:
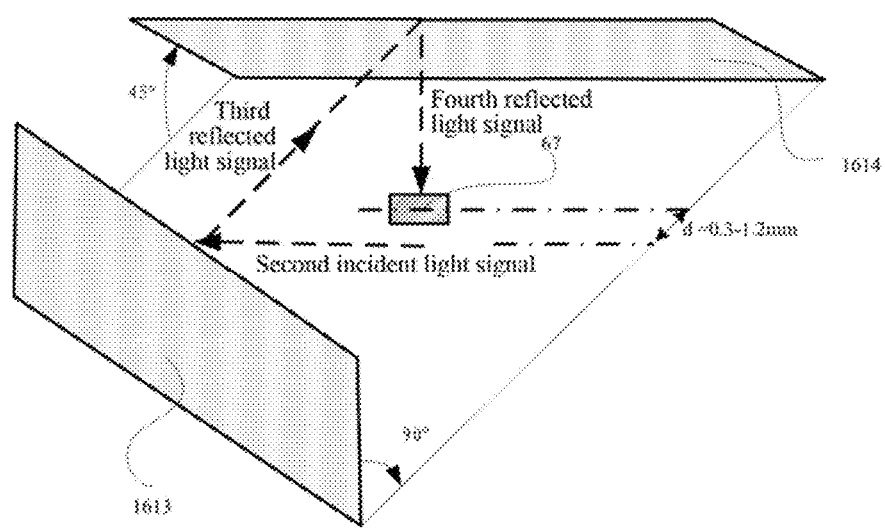
FIG. 17 is a schematic diagram of transmission in an optical path in a second lens assembly L2 according to some embodiments of the disclosure.

In some embodiments, as illustrated in FIG. 17, the third pattern drafting face 1613 is perpendicular to the circuit board P, and the angle between the third pattern drafting face 1613, and the plane defined by the fourth reflected light signal and the third reflected light signal is 45°, so that the second incident light signal is totally reflected by the third pattern drafting face 1613 so that the optical axis of the second incident light signal is rotated by 90° in a plane parallel to the circuit board P, thus resulting in the third reflected light signal; and the angle between the fourth pattern drafting face 1614 and the circuit board p is 45°, so that the optical axis of the third reflected light signal is rotated by 90° in a plane perpendicular to the circuit board P, thus resulting in a fourth reflected light signal, where the optical axis of the fourth reflected light signal is perpendicular to the circuit board P.

In a process of packaging the real second lens assembly L2, in order to facilitate removal of a pattern drafting body, the third pattern drafting face 1613 tends not to be perpendicular to the circuit board P, and the angle between the third pattern drafting face 1613 and the circuit board P is approximate to 90°, so the angle between the fourth pattern drafting face 1614 and the circuit board P will also be offset accordingly in order to accommodate the optical path as required.

Figure 18:
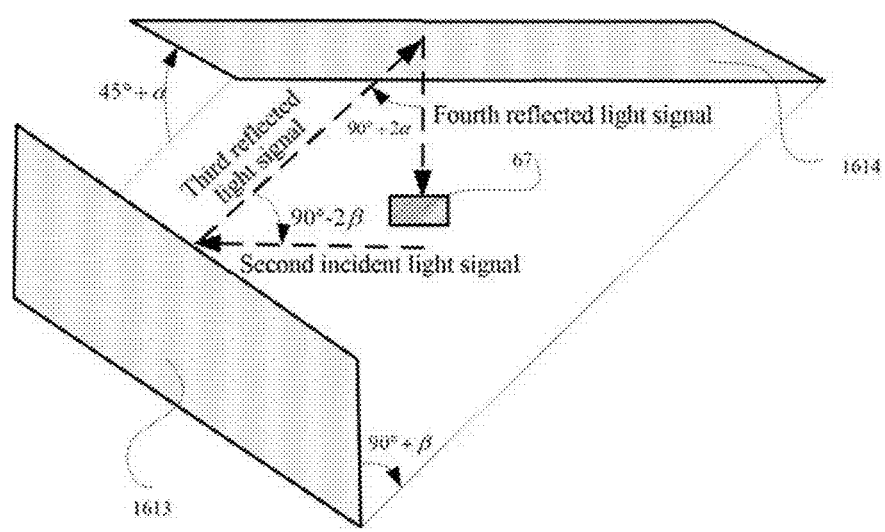
FIG. 18 is a schematic diagram of transmission in an optical path in a second lens assembly L2 according to some embodiments of the disclosure.

In an embodiment, as illustrated in FIG. 18, the angle between the third pattern drafting face 1613 and the circuit board P is 90° 13, and the angle between the third pattern drafting face 1613, and the plane defined by the fourth reflected light signal and the third reflected light signal is 45°, so that the second incident light signal is totally reflected by the third pattern drafting face 1613 so that the optical axis of the second incident light signal is rotated by 90°−2β in a plane parallel to the circuit board P, thus resulting in the third reflected light signal; and the angle between the fourth pattern drafting face 1614 and the circuit board P is 45°+α, so that the third reflected light signal is totally reflected by the fourth pattern drafting face 1614 so that the optical axis of the third reflected light signal is rotated by 90°+2α in a plane perpendicular to the circuit board P, thus resulting in the fourth reflected light signal, where the optical axis of the third reflected light signal is perpendicular to the circuit board P; and α=±3°, and β=±2°.\

In order to improve the efficiency of optical coupling by the second lens assembly L2 and the optic fiber, and to enable the second incident light signal entering the second optic fiber insertion port 1411 to be incident on the third reflecting face 1412 of the second lens assembly L2 in a direction parallel to the central axis of the second optic fiber insertion port 1411, the second lens assembly L2 further includes a fourth lens, located at the second optic fiber insertion port 1411, configured to converge the second incident light signal received by the second optic fiber insertion port 1411, which is further incident on the third reflecting face 1412.

Figure 19:
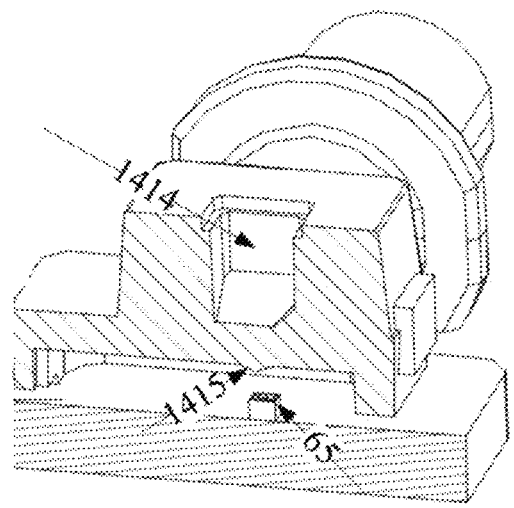
FIG. 19 is a schematic structural diagram of a receiver lens assembly of an optical module according to some embodiments of the disclosure.

In order to improve the efficiency of optical coupling by the light probing chip and the second lens assembly L2, and to enable the fourth reflected light signal transmitted through the second lens assembly L2 to be received by the prober chip 67 after being converged, the second lens assembly L2 further includes a third lens 1415 as illustrated in FIG. 16 or FIG. 19. The third lens 1415 located above the prober chip 67 (where the prober chip 67 is arranged in the prober 65 in FIG. 19) is configured to converge the fourth reflected light signal transmitted through the second lens assembly L2, and the converged fourth reflected light signal is received by the prober chip 67.

In the optical module above, in order to enable the transmitter lens assembly L1 and the receiver lens assembly L2 to be packaged separately on the circuit board P, the distance d between the projection of the central axis of the second optic fiber insertion port 1411 onto the circuit board P, and the center of the effective probing face of the prober chip 67 is 0.3 to 1.2 mm as illustrated in FIG. 17. In the embodiment above, the distance between the second driving chip 66 of the prober 65, and the laser driving chip can differ by more than 1.2 mm to thereby enable the transmitter lens assembly L1 and the receiver lens assembly L2 to be packaged separately on the circuit board P.

In the embodiment above, both the first lens assembly L1 and the second lens assembly L2 are separately packaged lens assemblies, and the position of the prober chip 67 in the second lens assembly L2 is adjusted so that the prober chip 67 is affixed on the circuit board P away from the projection of the central axis of the second optic fiber insertion port 1411 onto the circuit board P, and in this way, the projection of the central axis of the second optic fiber insertion port 1411 onto the circuit board P will not pass the center of the effective probing face of the prober chip 67, so that the prober chip 67 and the second driving chip 66 are positioned on the circuit board P as a whole away from the central line between a light transmitting port and a light receiving port, so the distance between the laser driving chip, and the driving chip 66 of the prober is increased to thereby reserve a larger space on the circuit board P for the first lens assembly L1 and the second lens assembly L2 to be package separately on the circuit board. The second lens assembly L2 is structurally adapted by arranging the third reflecting face 1412 and the fourth reflecting face 1413 in the second lens assembly L2 to alter the transmission optical path of the second incident light signal, received by the second optic fiber insertion port 1411 of the second lens assembly L2, in the second lens assembly L2, so that the second incident light signal entering the second lens assembly L2 is deflected by firstly the third reflecting face 1412 and then the fourth reflecting face 1413, and the deflected light signal is received by the prober chip 67. Both the first lens assembly L1 and the second lens assembly L2 are separately packaged lens assemblies without any interference to their respective optical paths to thereby improve the efficiency of optical coupling by the transmitter and the receiver of the optical module.

Figure 20:
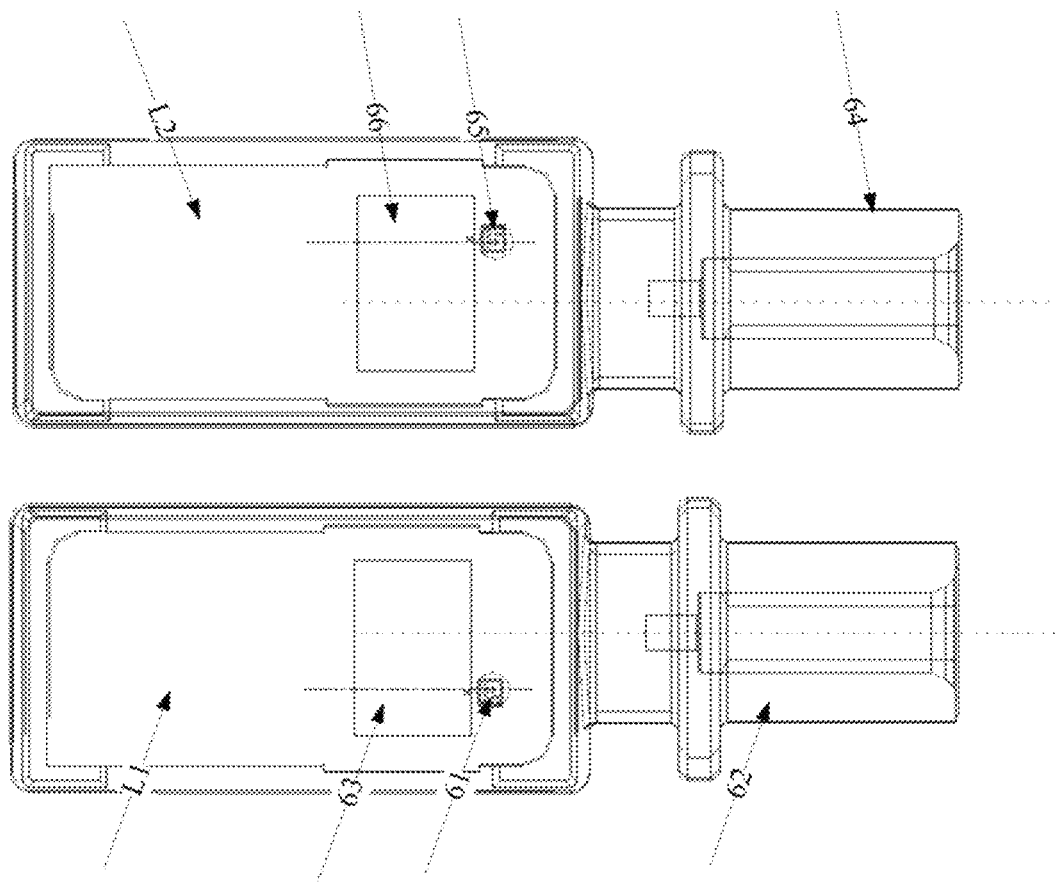
FIG. 20 is a schematic structural diagram of an optical module according to some embodiments of the disclosure.

The disclosure further provides some embodiments as illustrated in FIG. 20, where the first lens assembly L1 includes a laser 61 and a first driving chip 63, and there is a laser chip 60, i.e., a light transmitting chip, arranged in the laser 61. The projection of the central axis of a first optic fiber configured to be inserted into a first optic fiber insertion port 62 in the first lens assembly L1 onto the circuit board will not pass the center of the effective light-emitting surface of the laser chip 60. The second lens assembly L2 includes a light prober 65 and a second driving chip 66, there is a prober chip 67 arranged in the light prober 65, and the projection of the central axis of a second optic fiber configured to be inserted into a second optic fiber insertion port 64 in the second lens assembly L2 will not pass the center of the effective probing face of the light prober chip 67. The distance between the laser driving chip and the prober driving chip is increased in the limited space of the circuit board P, so that the first lens assembly L1 and the second lens assembly L2 can be packaged separately on the circuit board P. Reference can be made to the embodiments above for details of the first lens assembly L1 and the second lens assembly L2, so a repeated description thereof will be omitted here. Both the first lens assembly L1 and the second lens assembly L2 are separately packaged lens assemblies without any interference to their respective optical paths to thereby improve the efficiency of optical coupling by the transmitter and the receiver of the optical module.

Figure 21:
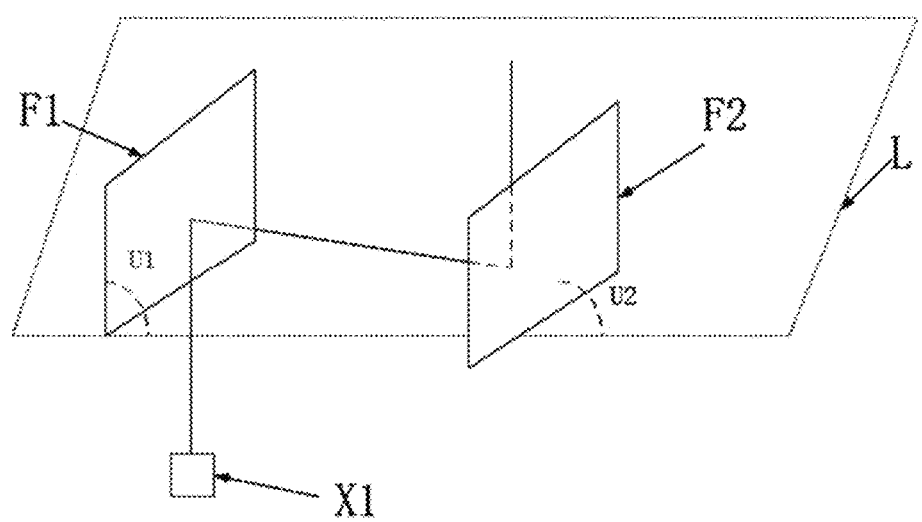
FIG. 21 is a schematic diagram of transmission in an optical path in an optical module according to some embodiments of the disclosure.

FIG. 21 is a schematic diagram of transmission in an optical path in an optical module according to an embodiment of the disclosure. As illustrated in FIG. 21, the angle U1 between the first reflecting face F1, and the surface L of the circuit board is less than 90°, and the angle U2 between the second reflecting face F2, and the surface L of the circuit board is less than 90'; and theoretically these two pattern drafting faces are perpendicular to the surface of the circuit board, and in view of the requirement on a pattern drafting process, these two pattern drafting faces are slightly inclined from being perpendicular to the surface of the circuit board, so both the angles thereof from the surface of the circuit board are less than 90 degrees. The angle U1 between the first reflecting face, and the surface of the circuit board may be 90°−α, and the angle U2 between the second reflecting face, and the surface of the circuit board may be 90°−β, where a ranges from 0° to 3°, and β ranges from 0° to 3°.

At this time, the light transmitting chip can be a light transmitting chip transmitting light from the sides thereof, and since the light exit direction of the light transmitting chip transmitting light from the sides thereof is parallel to the circuit board, and the heights of the optic fiber insertion ports are more than the height of the circuit board, the light transmitting chip transmitting light from the sides thereof is generally raised in height, and electrically wired with the circuit board.

Light is reflected by a pattern drafting face so that the light is propagated in such a direction that is not parallel to the surface of the circuit board due to an angle between the propagation direction thereof, and the surface of the circuit board because the pattern drafting face is slightly inclined, whereas the axis of an optic fiber insertion port is parallel to the surface of the circuit board, so the angles between the two pattern drafting faces, and the surface of the circuit board are spatially adjusted so that the direction in which the light is propagated between the pattern drafting faces is not parallel to the surface of the circuit board, the direction in which the light is propagated between the pattern drafting faces and the chip is parallel to the surface of the circuit board, and the direction in which the light is propagated between the pattern drafting faces and the optic fiber insertion ports is parallel to the surface of the circuit board.

The angle between the first reflecting face F1, and the surface of the circuit board, and the angle between the second reflecting face F2, and the surface of the circuit board can be preset as needed, although the embodiments of the disclosure will not be limited in this regard.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An optical module, comprising:
   a circuit board;
   a first chip;
   a second chip;
   an integrally packaged first lens assembly for placement on a surface of the circuit board; and
   an integrally packaged second lens assembly for placement on the surface of the circuit board, wherein:
   the first chip is arranged on the surface of the circuit board, and the integrally packaged first lens assembly is arranged in a chip on board package where the first chip is positioned between the integrally packaged first lens assembly and the surface of the circuit board;
   the second chip is arranged on the surface of the circuit board, and the integrally packaged second lens assembly is arranged in a chip on board package where the second chip is positioned between the integrally packaged second lens assembly and the surface of the circuit board;
   the integrally packaged first lens assembly comprises a first optic fiber insertion port, a first reflecting surface, and a second reflecting surface;
   the integrally packaged second lens assembly comprises a second optic fiber insertion port; and
   the first reflecting surface faces the first chip, the first reflecting surface faces the second reflecting surface, and the second reflecting surface faces the first optic fiber insertion port.

2. The optical module according to claim 1, wherein a light propagation path between the first chip and the first reflecting surface is perpendicular to an axis of the first optic fiber insertion port.

3. The optical module according to claim 2, wherein:
   the integrally packaged first lens assembly further comprises a first lens and a second lens;
   the first lens is arranged between the first chip and the first reflecting surface; and
   the second lens is arranged at the first optic fiber insertion port.

4. The optical module according to claim 1, wherein a light propagation path between the first chip and the first reflecting surface is parallel to an axis of the first optic fiber insertion port.

5. The optical module according to claim 2, wherein:
   a distance between an axis of the first optic fiber insertion port and an axis of the second optic fiber insertion port is less than a distance between the first chip and the second chip.

6. The optical module according to claim 2, wherein a concave groove is located on an upper surface of the integrally packaged first lens assembly, a bump is located in the concave groove, and the first reflecting surface and the second reflecting surface are located on a surface of the bump.

7. The optical module according to claim 5, further comprising a first driving chip driving the first chip, and a second driving chip driving the second chip;
   wherein a straight line defined between a pin of the first chip and a pin of the first driving chip is perpendicular to a side of the first driving chip, and a straight line defined between a pin of the second chip and a pin of the second driving chip is perpendicular to a side of the second driving chip.

8. The optical module according to claim 2, wherein:
   the integrally packaged second lens assembly further comprises a third reflecting surface and a fourth reflecting surface; and
   the third reflecting surface faces the second chip, the third reflecting surface faces the fourth reflecting surface, and the fourth reflecting surface faces the second optic fiber insertion port.

9. The optical module according to claim 8, wherein:
   the first chip is a light transmitting chip, the first reflecting surface is configured to reflect light rays exiting the light transmitting chip to the second reflecting surface, and the second reflecting surface is configured to reflect the light rays reflected by the first reflecting surface to the first optic fiber insertion port; and
   the second chip is a light probing chip, the fourth reflecting surface is configured to reflect light rays incident on the second optic fiber insertion port to the third reflecting surface, and the third reflecting surface is configured to reflect the light rays reflected by the fourth reflecting surface to the light probing chip.

10. The optical module according to claim 8, wherein:
    the integrally packaged second lens assembly further comprises a third lens and a fourth lens;
    the third lens is arranged between the second chip and the third reflecting surface; and
    the fourth lens is arranged at the second optic fiber insertion port.

11. The optical module according to claim 2, wherein the integrally packaged second lens assembly further comprises a fifth reflecting surface facing the second chip and the second optic fiber insertion port.

12. The optical module according to claim 11, wherein:
the first chip is a light transmitting chip, the first reflecting surface is configured to reflect light rays exiting the light transmitting chip to the second reflecting surface, and the second reflecting surface is configured to reflect the light rays reflected by the first reflecting surface to the first optic fiber insertion port; and
the second chip is a light probing chip, and the fifth reflecting surface is configured to reflect light rays incident at the second optic fiber insertion port to the light probing chip.

13. The optical module according to claim 11, wherein:
the first chip is a light probing chip, the second reflecting surface is configured to reflect light rays incident on the first optic fiber insertion port to the first reflecting surface, and the first reflecting surface is configured to reflect the light rays reflected by the second reflecting surface to the light probing chip; and
the second chip is a light transmitting chip, and the fifth light reflecting surface is configured to reflect light rays exiting the light transmitting chip to the second optic fiber insertion port.

\* \* \* \* \*